United States Patent [19]
Morriss

[11] 3,942,041
[45] Mar. 2, 1976

[54] THYRISTOR CONTROL CIRCUIT
[75] Inventor: James W. Morriss, Carrollton, Tex.
[73] Assignee: Atmos Corporation, Carrollton, Tex.
[22] Filed: Oct. 18, 1973
[21] Appl. No.: 407,582

[52] U.S. Cl...... 307/252 M; 307/252 N; 307/252 J; 307/297
[51] Int. Cl.² ......................................... H03K 17/00
[58] Field of Search ........ 307/252 M, 252 N, 252 J, 307/252 K, 252 L, 293, 255, 301, 297; 328/144

[56] References Cited
UNITED STATES PATENTS

| | | | |
|---|---|---|---|
| 3,005,113 | 10/1961 | Schmid et al. | 328/144 X |
| 3,303,413 | 2/1967 | Warner et al. | 307/297 X |
| 3,304,487 | 2/1967 | McCaskey, Jr. | 307/301 X |
| 3,471,719 | 10/1969 | Hughes | 307/293 |

Primary Examiner—Stanley D. Miller, Jr.
Assistant Examiner—B. P. Davis
Attorney, Agent, or Firm—Macka L. Murrah

[57] ABSTRACT

A circuit for linearizing the power output of a thyristor uses a threshold switch to pulse the thyristor into the conducting mode. An accumulating capacitor provides a current to operate the threshold switch. The current that charges the accumulating capacitor arises in a DC amplifier and absolute value of sine current source. The accumulating capacitor may discharge either through the threshold switch or through a shunt switch if the threshold has not been attained within a predetermined time period. The timing device for the shunt switch is a sync pulse supply that keys off the absolute value of sine current source.

11 Claims, 9 Drawing Figures

THYRISTOR CONTROL CIRCUIT

BACKGROUND OF THE INVENTION

The invention relates to control of thyristors and more particularly to linearizing the output of such thyristors.

Thyristors, which include both silicon-controlled-rectifiers (SCR's) and triacs, are solid state switching devices that display a low resistance, or conducting mode and a high resistance, or non-conducting mode. The mode is controlled by a gate input, and thyristors will not conduct an electrical current until a firing voltage, either a sufficiently high voltage called break over voltage or a pulse voltage, is applied to the gate. The former may be called the break over mode and the latter a pulse mode. SCR's and triacs both display this same resistance characteristic. The only difference between the two is that a triac is a bi-directional device, while an SCR is uni-directional.

Thyristors are often used in AC power circuits to control the amount of power supplied to a device. By controlling the supply of power, an operating aspect of the device, such as the speed of electrical motor or the intensity of a light for example, can be regulated. However, when a thyristor is used to control a sine wave signal the thyristor provides non-linear control over the output power to the device. Thus, a linear change in control input to a thyristor will provide a non-linearly changing power output to the controlled device. This is due to the fact that the amount of power that a wave can produce is proportional to the total area encompassed under the wave and that the area under a sine wave changes non-linearly with time. The non-linearity makes power adjustments both difficult and inaccurate, making it much more desirable to have linear control over a device.

The current means of linearizing a thyristor output signal is a ramp and pedestal circuit, such as that illustrated in the General Electric SCR Manual (5th Ed.), paras. 9.5.1 and 9.5.2. This circuit is connected between the thyristor and a potentiometer, or other similar device, that controls the input voltage to the thyristor. It provides a non-linear gate control signal that substantially compensates for or cancels out the non-linearity of an output signal. The circuit operates by first null-wave rectifing a sine wave power signal (which is customarily 120 volts R.M.S.), and thereafter the rectifier current is divided into two portions. One is reduced in magnitude and fed into an accumulating capacitor. The other is reduced in magnitude by a power resistor and clipped by a shorting zener diode, resulting in a pedestal wave. The pedestal wave is then fed through a controlling transistor into the accumulating capacitor, and it is added to the rectified sine wave. The resulting wave is a modified pedestal wave having a sinusoidally-rising plateau. The magnitude or voltage level of the modified pedestal wave depends upon the magnitude of the pedestal wave that is fed into the summing capacitor. This is regulated by the controlling transistor, which connects to the potentiometer. The accumulated voltage in the capacitor discharges through a unijunction transistor when the capacitor voltage reaches a threshold level. The time at which the threshold voltage is reached depends upon the magnitude of the modified pedestal wave which in turn is controlled by the potentiometer. The output of the unijunction transistor is coupled through a transformer to the gate of a thyristor. The discharging voltage from the capacitor causes the thyristor gate to place the thyristor in a conducting mode and it can thus deliver power to a load.

Although the ramp and pedestal circuit substantially linearizes thyristor output, it has several severe shortcomings. First, it has a high voltage reference that poses the hazard of a severe shock to a user. This is due to the use of a full wave rectifier whose output is not referenced to ground, which in a conventional 120 volt AC circuit would place the controlling potentiometer that is manipulated by a user about 60 volts above ground. One solution that is used by the industry is an isolation transformer following the full wave rectifier. However, it consumes a large amount of power and introduces distortion into the circuit. Second, the power resistor in the pedestal wave portion of the circuit dissipates a large amount of heat and thus wastes considerable power. Third, the rectified sine wave portion of the circuit does not produce a perfect full-wave rectified current due to distortion introduced by the charging of the accumulating capacitor.

It is therefore an object of the invention to provide a thyristor control circuit that overcomes the problems of the prior art.

SUMMARY OF THE INVENTION

The invention comprises a threshold switch that is activated by a voltage supplied by an accumulating capacitor. The capacitor is charged by a controlled, ground-referenced absolute value of sine wave current (hereinafter /sine/) source and a DC amplifier. A shunt switch periodically discharges the capacitor if the threshold switch is not activated during one period of the /sine/. The shunt switch is activated by a sync pulse supply that produces a pulse when the /sine/ reaches a predetermined level. The threshold switch produces a pulse that causes a thyristor to enter its conducting mode. The time at which the accumulating capacitor discharges through the threshold switch is determined by the voltage level supplied by the DC amplifier.

BRIEF DESCRIPTION OF THE DRAWINGS

The invention can be more completely understood and further objects and advantages may be had by referring to the following description taken in conjunction with the accompanying drawings, in which.

THEORY OF THE INVENTION

Figure 1A:
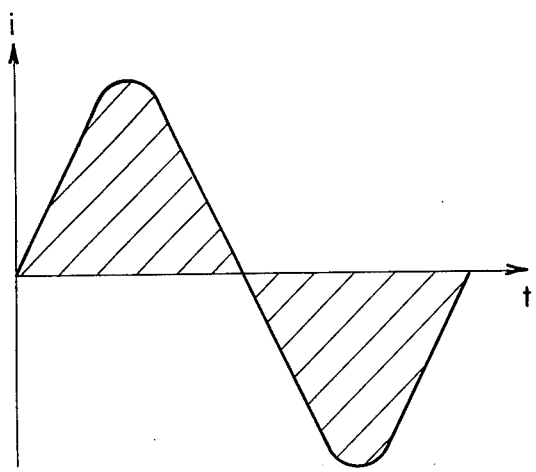
FIG. 1A is a graph of a sine wave illustrating its power content.
Figure 1B:
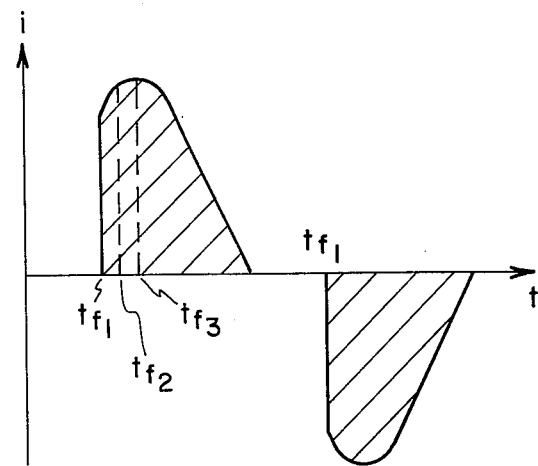
FIG. 1B is a graph of the sine wave of FIG. 1A after having been operated upon by a triac, showing the effect of different triac firing times upon the power content of the wave.

Thyristors control the flow of AC current to a device by conducting only a portion of the AC wave. FIG. 1A shows one cycle of a sine wave with the shaded area under the curve being proportional to the amount of power supplied by the wave. FIG. 1B shows the same sine wave after having been operated upon by a thyristor, which in this case is a triac. The time at which the firing voltage is applied to the gate is designated $T_f$.

Figure 1C:
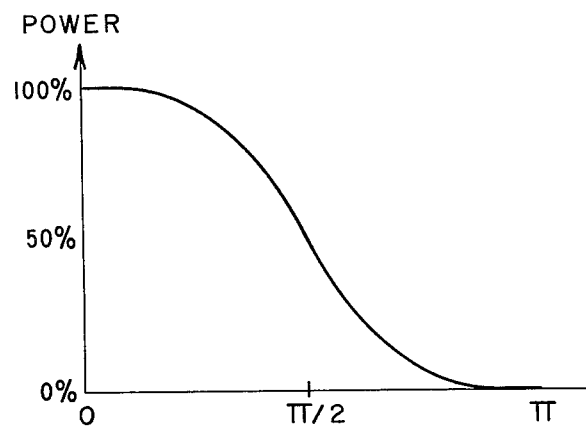
FIG. 1C is a graph of the power output in terms of percentage of full power that a triac will produce as a function of firing time in operating upon the sine wave as shown in FIG. 1B.
Figure 1D:
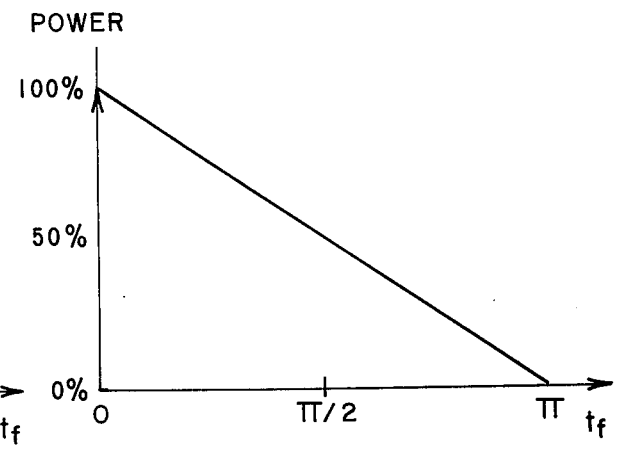
FIG. 1D is a graph of the desired power output of a triac as a function of firing time.

The non-linearity of the output occurs when the firing time is changed. As may be seen in FIG. 1B, the amount of power that a thyristor will supply to a device changes in different amounts in different parts of the wave for a constant change in firing time. A change in firing time from $T_{f1}$ to $T_{f2}$ removes a different amount of area, and thus power, from under the curve than an equal change from $T_{f2}$ to $T_{f3}$. FIG. 1C illustrates the non-linearity in a plot of power in terms of percentage of maximum output versus firing time for one half of a sine wave cycle. In FIG. 1D is the desired power-time response.

Figure 1E:
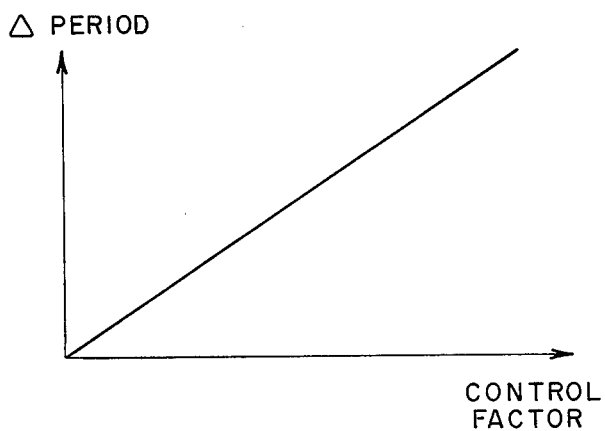
FIG. 1E is a graph of a typical linear triac gate input signal that produces the non-linear power output characteristic shown in FIG. 1C.
Figure 1F:
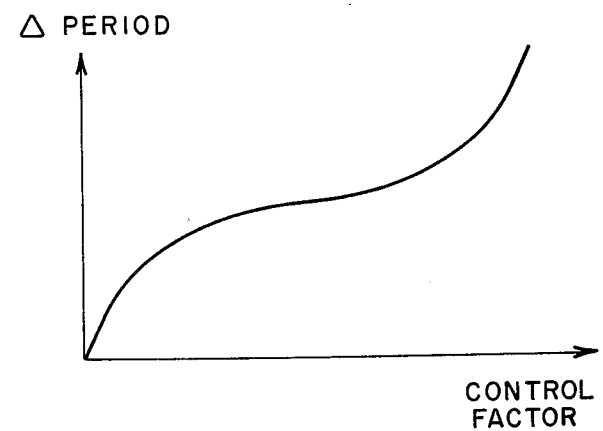
FIG. 1F is a graph of a compensating triac input control signal that will produce the power output characteristic shown in FIG. 1D.

The non-linearity is worst when the period of the firing pulses and thus firing time varies linearly. In other words a linear gate input results in the worst non-linear power output. The non-linearity can be compensated by providing a non-linearly varying firing pulse period that cancels the effects of the output non-linearity. Thus, a linear output can be obtained by providing a compensating non-linear gate input. FIG. 1E shows a plot of a pulse period that changes linearly with a controlled factor, such as voltage. It will produce the non-linear output curve shown in FIG. 1C. FIG. 1F illustrates a compenating non-linear input that will produce the desired curve shown in FIG. 1D.

DESCRIPTION OF THE PREFERRED EMBODIMENTS

Figure 2:
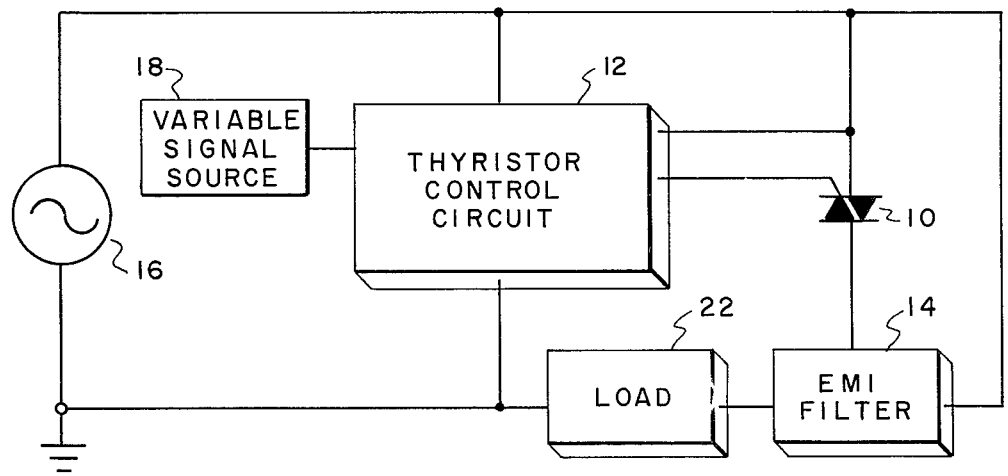
FIG. 2 is a block diagram of a generalized thyristor control system.
Figure 3:
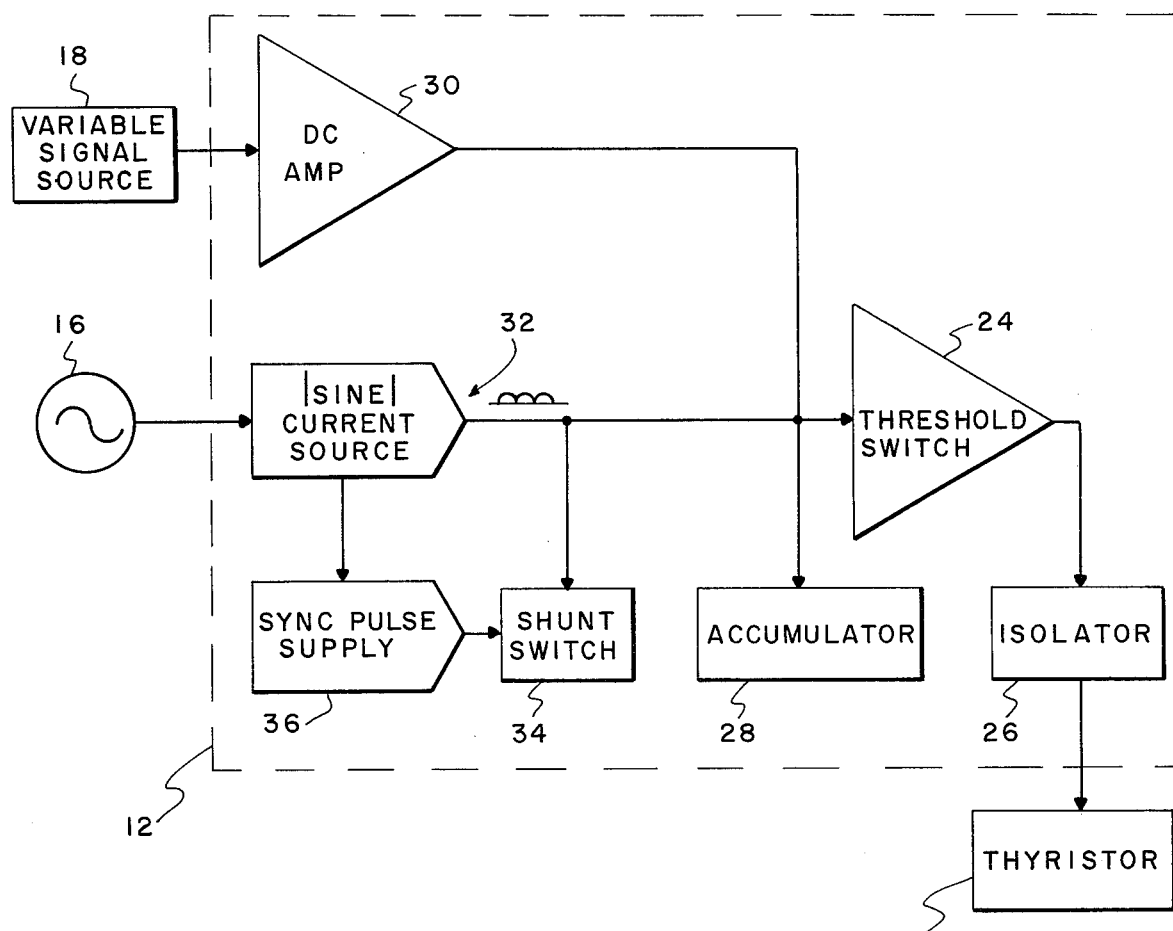
FIG. 3 is a more detailed block diagram of the thyristor control circuit of FIG. 2 embodying the present invention.

FIG. 2 shows a generalized block diagram that may be used to provide a compensating non-linear firing voltage to a thyristor. A thyristor, shown here as a triac, connects to a thyristor control circuit 12, and electromagnetic interference (EMI) filter 14, and an AC voltage source 16 typically 120 volts. The thyristor control circuit 12 also connects to the AC voltage source 16, a linearly variable control signal source 18, and a load 22. The EMI filter 14 also connects to the AC voltage source 16 and the load 22. In operation the AC voltage source operates a device represented by load 22, and triac 10 controls the amount of power that reaches load 22. The EMI filter 14 removes any noise that might be introduced into the circuit by the switching of triac 10. The thyristor control circuit 12 supplies triac 10 with a firing voltage that compensates for the non-linearity in triac 10. The variable signal source 18, which may be a potentiometer connected to a DC voltage source for example, provides a means of timing a thyristor control circuit 12. FIG. 3 shows a more detailed block diagram of the thyristor control circuit 12 and associated apparatus. The thyristor 10 communicates with a threshold switch 24 that controls the thyristor operation. An isolater 26 may be placed between the thyristor 10 and threshold switch 24. The threshold switch 24 activates the thyristor 10 with a current derived from accumulator 28. The charge in accumulator 28 derives from a DC amplifier 30 and /sine/ source 32. The DC amplifier 30 connects to the variable signal source 18, and the current source 32 connects to the AC generator 16. The accumulator 28 also connects to a shunt switch 34, which is controlled by a sync pulse supply 36 which generates its pulse output in response to current source 32.

In operation the DC amplifier 30 generates a DC current in response to variable signal source 18, and it is stored in the accumulator 28. Current source 32 generates /sine/ in response to AC generator 16 and also stores it in accumulator 28, the result being a sum of the DC current and the absolute value of sine current in the accumulator 28. When the voltage of the accumulator 28 reaches the threshold voltage of threshold switch 24, the charge in accumulator 28 discharges through threshold switch 24, through isolator 26 to thyristor 10, thereby causing the thyristor to enter the conducting mode. Sync pulse supply 36 generates a pulse waveform for response to current source 32. The shunt switch 34 periodically discharges any charge that is in accumulator 28 in response to sync pulse supply 36. Thus, shunt switch 34 discharges the accumulator 28 if the sync pulse supply 36 supplies a pulse before the accumulator voltage reaches the threshold voltage of threshold switch 24. The shunt switch 34 thus performs a clearing function to prepare the accumulator 28 for receiving the next cycle from the current source 32. The threshold voltage of threshold switch 24 is controlled by varying the DC current supplied by DC amplifier 30 with variable signal source 18.

Figure 4:
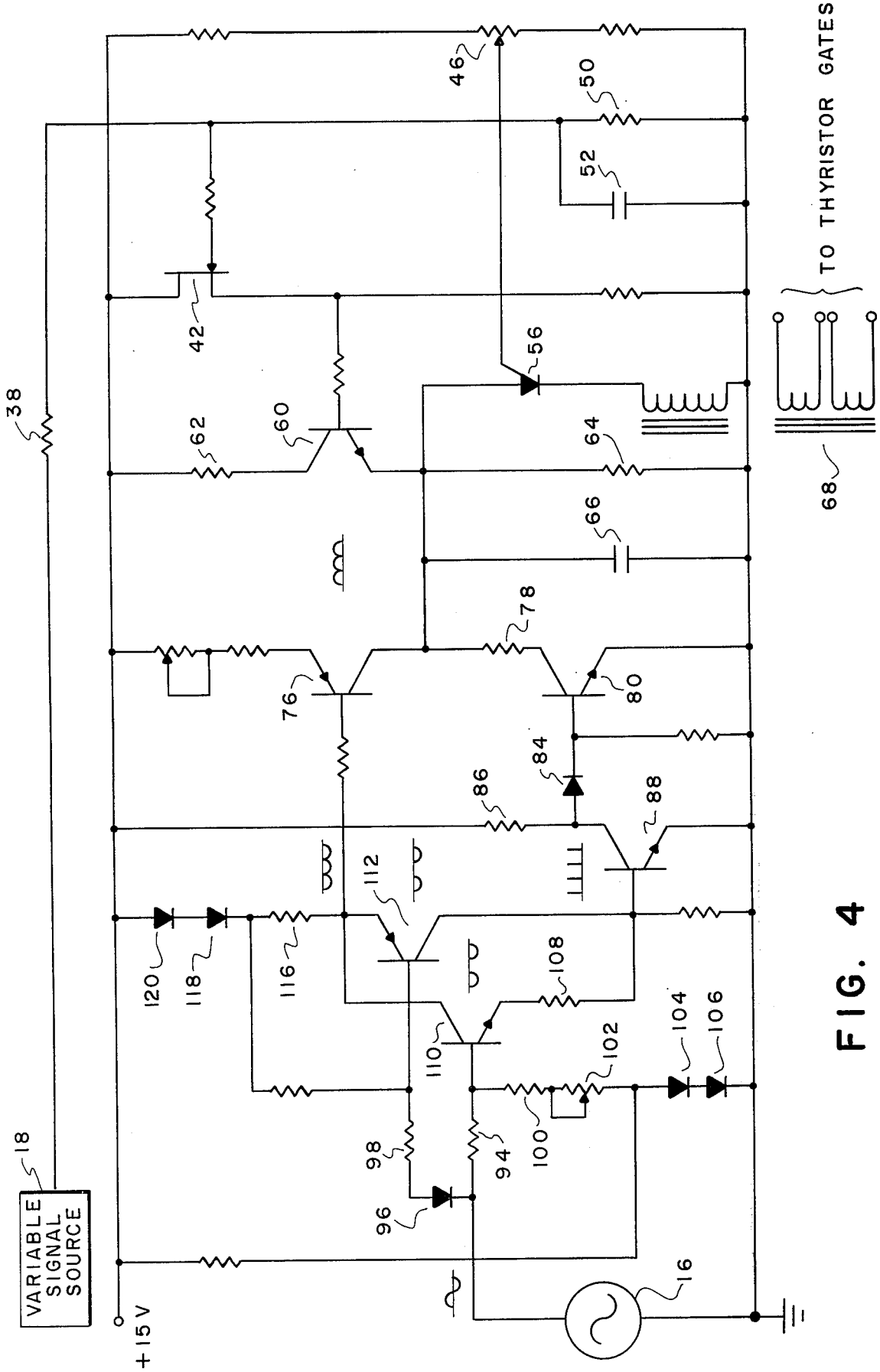
FIG. 4 is a schematic diagram of a circuit embodying the invention.

FIG. 4 shows a detailed schematic diagram of the circuit embodying the invention. The DC amplifier portion of the circuit includes field effect transistor 42 and PNP transistor 60. When variable signal source 18 provides a DC signal larger than zero, a DC current flows through limiting resistor 38 and opens the gate of field effect transistor 42. Resistor 50 and and capacitor 52 form a filter to remove any signal that might spuriously open the field effect transistor gate in the absence of a signal from the variable signal source 18. When the field effect transistor 42 opens it conducts a DC current from a DC current source, which in this case operates at 15 volts DC. The current from field effect transistor 42 opens the gate of PNP transistor 60 and allows it to conduct a current. Transistor 60 also conducts a DC current from the same 15 volt source through limiting resistor 62. The current from transistor 60 then enters the accumulator circuit.

The accumulator circuit consists of a resistor 64 and a capacitor 66. Resistor 64 is chosen to be a very high value in order to provide a large time constant for the accumulator circuit. Current emanating from transistor 60 enters the accumulator circuit and charges capacitor 66. Simultaneously, the accumulator circuit also receives a /sine/ from the /sine/ portion of the circuit.

The /sine/ source includes transistors 110 and 112. The current source portion operates on a current provided by AC generator 16. When the AC signal is in its positive half, the current flows through resistor 94 to the gate of transistor 110. The gate of transistor 110 is biased by resistors 100 and 102. Diodes 104 and 106 prevent a reverse flow of current from the grounded terminal to the gate of transistor 110. Diode 96 prevents a current from flowing to the gate of transistor 112 when the AC generator is in the positive half of its cycle. In the emitter collector portion of transistor 110's circuit are blocking diodes 118 and 120 and limiting resistors 116 and 108. As the current in the gate of transistor 110 rises above its biased level in following the AC signal provided by generator 16, the current in transistor 110's emitter collector circuit begins to flow through diodes 120 and 118, resistor 116, transistor 110 and resistor 108. The current form in transistor 110's emitter collector circuit is an inverted duplicate of the positive half of the sine wave signal provided by generator 16. Transistor 110 conducts only during the positive half of the signal provided by generators 16 and thus its output signal will be a periodically repeated negative half of a sine wave signal.

During the positive half of the signal provided by generator 16, transistor 112 does not conduct. However, when the signal nears the negative half of its cycle, a current will flow from the base transistor 110 through resistor 98 and diode 96 to the source, thereby opening the gate transistor 112. During this half of the cycle transistor 110 will not conduct. As the current in the base of NPN transistor 112 rises above its biased value, the emitter collector circuit of transistor 112 will begin to conduct a current from the 15 volt source through diodes 120 and 118, resistor 116 and transistor 112.

The current in the circuit at that time is the same as that in transistor 112, except that it is displaced by 180°. Thus, when transistor 110 is conducting, transistor 112 is not and vice versa. The result is that at the node between resistor 116 and transistor 110 and 112 an inverted full wave rectified sine wave will appear which is the sum of the current waveforms produced by transistors 110 and 112. This composite current waveform appears at the gate of NPN transistor 76. Transistor 76 inverts the waveform to produce a positively oriented, regulated full wave rectified, or /sine/ waveform. This current then enters capacitor 66 and is summed with the signal produced by the DC amplifier.

After the capacitor 66 has been charged by the DC amplifier portion of circuit and the /sine/ source portion, one of two things can happen. First the charge in capacitor 66 will be sufficient to activate the threshold switch portion of the circuit. Second the charge in capacitor 66 will not reach a level sufficient to activate the threshold switch within one charging cycle measured by the period of the signal produced by generator 16, and the capacitor will be discharged by the shunt switch portion of the circuit in order that the capacitor will be prepared to be recharged during the next cycle.

The shunt switch portion of a circuit consists primarily of a transistor 80. When the gate of transistor 80 receives a current higher than its biased value, transistor 80 will open and the charge in capacitor 66 will discharge through resistor 78 and transistor 80 to ground. The signal that causes transistor 80 to open is provided by the sync pulse supply portion of the circuit. The sync pulse supply keys off the /sine/ signal produced by transistors 110 and 112. This signal appears at the gate of transistor 88, which comprises the major element of the sync pulse power supply. Transistor 88 is biased such that it will conduct only when the inverted /sine/ reaches a peak which occurs only for a very brief instant at the beginning of each cycle. Since the transistor conducts only for a brief instant, the current flowing from the 15 volt source through resistor 86 and transistor 88 is an impulse current whose period is the same as that of the absolute value of sine current produced by transistors 110 and 112 and this identical to the charging period of capacitor 66. The pulse current produced by transistor 88 enters the shunt switch portion of the circuit through a blocking diode 84.

The threshold switch portion of the circuit includes a unijunction transistor 56, whose firing voltage is determined by variable resistor 46 connected to the unijunction transistor's gate. If the charge in capacitor 66 reaches the firing level of unijunction transistor 56 before the end of the cycle of the /sine/, the charge will discharge through unijunction transistor 56 as a pulse and enter the isolator portion of the circuit, which consists of an isolation transformer 68. Isolation transformer 68 is connected to the thyristor gate, and the pulse supplied by the discharging of capacitor 66 will pulse the thyristor gate open. The thyristor will then supply a current from AC generator 16 to the load.

Although the circuit embodying the invention may be used to control AC power to any type of load, it is particularly useful in lighting control circuits. In such an application the following is a preferred list of component values for the circuit of FIG. 4:

Resistor 38, 3.9M, ½W
Resistor 46, 5K Trimmer
Resistor 50, 10M, ½W
Resistor 62, 2.7K, ½W
Resistor 64, 1M, ½W
Resistor 78, 10K, ½W
Resistor 86, 10K, ½W
Resistor 100, 10K, ½W
Resistor 102, 50K,Trimmer
Resistor 116, 10K, ½W
Resistor 108, 6.8K, ½W
Capacitor 52, 0.01 microfarads, 250V
Capacitor 66, 0.068 microfarads, 250V
Diode 84, IN4003
Diode 96, IN4003
Diode 104, IN4003
Diode 106, IN4003
Diode 118, IN4003
Diode 120, IN4003
Transistor 60, TIS 97/98/2N930
Transistor 80, TIS 97/98/2N930
Transistor 88, TIS 97/98/2N930
Transistor 110, TIS 97/98/2N930
Transistor 76, 2N 4061/2N3702
Transistor 112, 2N 4061/2N3702
Transistor 42, 2N 5718
Transistor 56, NPU 131

The invention thus provides a thyristor control circuit that overcomes possible shock hazard to users, uses considerably less power and dissipates considerably less heat and provides a more nearly perfectly linear thyristor power response.

While particular embodiments of the present invention have been shown and described, it is apparent that changes and modifications may be made without departing from the invention in its broader aspects, and therefore the aim in the appended claims is to cover all such changes and modifications that fall within the true spirit and scope of the invention.

What is claimed is:

1. In a thyristor circuit for controlling high-power AC signals, a circuit for linearizing the thyristors control response, comprising: means for generating a variable level DC signal; means for generating an absolute value of sine signal; means for accumulating said two signals to provide a signal level that may reach a threshold level; means in communication with the accumulating means for activating the thyristor in response to the threshold level by discharging the accumulating means; and means for periodically discharging the accumulating means if the threshold level is not reached within the period of the sine signal.

2. The circuit of claim 1 wherein the DC current generating means comprises: a DC transistor signal amplifier; a field-effect-transistor current regulator in circuit with transistor current amplifier; and a variable signal source in communication with the field-effect-transistor current regulator.

3. The circuit of claim 2 wherein the variable signal source comprises a manually controllable potentiometer.

4. The circuit of claim 1 wherein the absolute value of sine current generating means comprises: a first transistor amplifier responsive to the positive-going half of the AC power signal; a second transistor amplifier in complementary circuit with the first transistor amplifier, responsive to the negative-going half of the AC power signal; and a transistor inverter in circuit with the first and second transistor amplifiers.

5. The circuit of claim 1 wherein the accumulating means comprises: a capacitor; and a resistor in circuit with the capacitor.

6. The circuit of claim 1 wherein the thyristor activating means comprises a unijunction transistor.

7. The circuit of claim 6 wherein the unijunction transistor is coupled to the thyristor by an isolating transformer.

8. The circuit of claim 1 wherein the periodic discharging means comprises: means for shunting the accumulator signal to ground potential; and means for generating periodic signals to control the shunting means.

9. The circuit of claim 8 wherein the shunting means comprises a transistor switch.

10. The circuit of claim 8 wherein the periodic signal generating means comprises: a transistor impulse generator responsive to the absolute value of sine current generator.

11. A circuit for linearizing the response of a thyristor AC signal controller, comprising: a DC transistor current amplifier; a field-effect-transistor current regulator in circuit with the transistor current amplifier; a variable signal source in communication with the field-effect-transistor current regulator; an AC signal source; a transistor amplifier responsive to the positive-going half of the AC power signal; a transistor amplifier in complementary circuit with the positive-going transistor amplifier and responsive to the negative-going half of the AC power signal; a transistor inverter in circuit with the positive-going and negative-going transistor amplifiers; an accumulator capacitor in circuit with the DC transistor current amplifier and the transistor inverter; an accumulator resistor in circuit with the accumulator capacitor; a unijunction transistor in circuit with the accumulator capacitor; a transistor shunting switch in circuit with the accumulator capacitor; a transistor impulse generator in circuit with the transistor shunting switch, the positive going transistor amplifier, and the negative-going transistor amplifier.

* * * * *